United States Patent [19]

Schmidtchen et al.

[11] Patent Number: 4,618,654

[45] Date of Patent: Oct. 21, 1986

[54] BASE MATERIAL FOR SILANE GRAFTED, CROSSLINKED THERMOPLASTIC OR ELASTOMERIC MATERIAL

[75] Inventors: Hans-Martin Schmidtchen, Osnabrück; Hermann U. Voigt, Langenhagen, both of Fed. Rep. of Germany

[73] Assignee: Kabel-und Metallwerke Gutehoffnungshuette, Hanover, Fed. Rep. of Germany

[21] Appl. No.: 442,012

[22] Filed: Nov. 16, 1982

Related U.S. Application Data

[63] Continuation of Ser. No. 698,861, Jun. 23, 1976, abandoned.

[30] Foreign Application Priority Data

Jun. 23, 1975 [DE] Fed. Rep. of Germany ....... 2527935

[51] Int. Cl.$^4$ ............................................ C08F 275/00
[52] U.S. Cl. .................................... 525/288; 525/342
[58] Field of Search ................ 525/288, 698, 861, 342

[56] References Cited

U.S. PATENT DOCUMENTS 4,058,583  11/1977  Glander et al. ................. 264/176 R Primary Examiner—Amelia B. Yarbrough
Attorney, Agent, or Firm—Ralf H. Siegemund

[57] ABSTRACT

The base material for silance grafting is to be a mixture of at least 50% of a polyolefin (compound A) and of not more than 50% of a different polymer or elastomer serving as property modifier (compound B). The compound A is silane grafted separately or together with compound B. The grafted material is extruded around a conductor or a tube followed by crosslinking in the presence of moisture.

10 Claims, No Drawings

BASE MATERIAL FOR SILANE GRAFTED, CROSSLINKED THERMOPLASTIC OR ELASTOMERIC MATERIAL

This is a continuation of application Ser. No. 698,861, filed June 23, 1976, now abandoned.

BACKGROUND OF THE INVENTION

The present invention relates to improvements in the preparation of thermoplastic or elastomeric material onto which silane or a silane compound is grafted to obtain subsequently crosslinking in the presence of moisture.

It is known to graft silane or a silane compound onto the macromolecules of a thermoplastic or an elastomeric material being the base material. The base material, the silane additives, such as peroxide activators etc., are mixed and mechanically worked (kneaded, extruded) before and, possibly, during grafting (see e.g. U.S. patent application Ser. No. 557,108; filed Mar. 10, 1975, now U.S. Pat. No. 4,289,860. Subsequently, the material is degassed (see e.g. U.S. patent application Ser. No. 642,764; filed Dec. 22, 1975, now U.S. Pat. No. 4,117,063), and e.g. extruded onto and around a cable, conductors, tubes or the like, which operation is followed by crosslinking.

Condensation crosslinking is, of course, well known. It is also known to graft organic functional alcoxy silane onto polyethylene macromolecules whereby so-called radical initiators such as peroxides are used to obtain the grafting proper. In cases mechanical working can be used to produce intermediary free radicals (see e.g. German printed patent application No. 1,794,028). It is also known to use as the base material a synthetic rubber such as a copolymer of ethylene vinylacetate (EVA) for condensation crosslinking. Unlike the case of thermoplastics, crosslinking of such an elastomeric material is produced primarily for producing a heat resisting material. However, such a material has inferior electrically insulative properties than polyethylene or its copolymers so that its use is linked to low voltage insulation.

DESCRIPTION OF THE INVENTION

It is an object of the present invention to control the properties of silane grafted, crosslinked, thermoplastic, and/or elastomeric materials.

It is a specific object of the present invention to improve a method in which a thermoplastic or elastomeric base material is mixed with silane or a silane compound and with further additives needed for grafting and crosslinking, which mixture is subsequently worked followed (or accompanied) by grafting, degassing, forming, and crosslinking.

In accordance with the preferred embodiment of the present invention, it is suggested to use as base material a mixture of polymers being comprised of at least 50% of a component A and of not more than 50%, but at least about 10%, of a component B; the component A to be a polyolefin or one of its copolymers, and component B is a modifier which includes an elastomer or any other polymer or mixture of polymers, preferably of the type that can be silane grafted.

Such a mixture of polymers could also be termed a polyblend and will then be used as base material onto which silane is grafted to be crosslinked later in the presence of moisture. Using such a mixture of a polyolefin and of a modifier has the advantage that the properties of cable or tube jackets produced from such a material can be very accurately adjusted to the respective needs. For example, the extrudability can be predetermined in that the modifier influences the flow characteristics of the material while being extruded. Also the strength, flexibility, and electrical properties can be controlled through choice and proportioning of the modifier.

In furtherance of the invention, it is suggested to use pure polyethylene as component A, blended with a component B which includes an ethylene-propylene rubber (EPR), whereby the ratio of A:B is about 5:1. This mixture is very suitable for making a cable insulation because the melting viscosity is quite high. Instead of using pure polyethylene, component A may be comprised of a co-polymer of ethylene with small quantities of acrylate, butene, hexene, propylene and vinyl acetate, individually or several of these modifiers. It is essential that component A will constitute more than 50% of the mixture of the components A and B.

The component B serves as property modifier, i.e. it is added to control the desired properties. If the modifier B is an elastomeric material, one can use here the above mentioned ethylene propylene rubber (EPM or EPDM) or butyl rubber or chlorine-sulfonated polyethylene, etc. In other cases the component B could be a thermoplastic material such as chlorinated polyethylene, a polyisobutylene, a polybutene or a polypropylene. The first mentioned material renders the final product more or less inflammable because of the chlorine content.

In practicing the invention, components A and B are added at the desired ratio and mixed with the graft component, activator, stabilizer, etc., and blended (see e.g. U.S. Pat. No. 4,058,583 and U.S. Pat. No. 4,289,860).

The amount of silane needed is at least half a percentage up to 10 parts by weight per 100 parts graftable base material. Subsequently or even already during blending the silane is grafted. The mixing may be obtained by a high speed mixer and the material may be placed into a grafting and shaping extruder, or mixing may be obtained right in the extruder; see e.g. U.S. patent application Ser. No. 642,764.

The various processes disclosed in these applications are readily applicable here, including the particular materials for activation, grafting, initiating, etc.

An alternative method of practicing the invention includes a modification in the sequence of steps. For example, component A may be grafted first with silane. In other words, component A is mixed first with silane and additives followed by grafting. Subsequently, the modifier B is added and blended with the grafted component A. Modifier B has not been grafted on, particularly if it is a butyl rubber. This way one avoids decompositioning of the rubber. In any event, the grafted component A is mixed subsequently with ungrafted component B to be processed further as needed.

Another alternative in practicing the invention is to be seen in that both components A and B are grafted separately with silane, and only thereafter are the two components blended together. This way one can use different graft compounds for the two components.

The following example was found particularly suitable. The following materials were mixed together and agitated.

|  | Parts by Weight |
| --- | --- |
| Polyethylene (1810H) | 70 to 90 |
| EPDM (sequence type) | 30 to 10 |
| an aromatic oil | 2 to 5 |
| vinyltrimethoxisilane | 1 to 5 |
| organic peroxide | 0.1 to 0.5 |
| A 2,2,4 trimethyl-dihydroquinolin traded under the designation | |
| Anox HB | 0.4 |
| Naftovin SN/L | 0.05 |

The last three components are additive needed for grafting the silane, the last two are listed by trade names.

The EPDM improves the flexibility (over a compound using only polyethylene as base material). Also, heat resistance and resistance against deforming when still hot, i.e. right after leaving the extruder, is considerably improved.

This is important if the material is extruded as a jacket onto a conductor. The material must not flow around the conductor as the latter must be embedded centrally (and not eccentrically) in the insulation. The EPDM also improves (reduces) the corona sensitivity of the polyethylene. The aromatic oil serves for improving working but improves also the breakthrough resistance of the cable.

The invention is not limited to the embodiments described above but all changes and modifications thereof not constituting departures from the spirit and scope of the invention are intended to be included.

We claim:

1. In a method for making cross-linked thermoplastic or elastomeric material, comprising:
   providing as a base material a blend (100%) of a component A and a component B, at a ratio of at least 50% by weight of component A to not more than 50% by weight, but at least 10% by weight of component B, wherein component A is comprised of a silane-graftable polyolefin or of one of its silane-graftable copolymers, and component B is a modifier being different from component A and having different physical properties, by being an elastomer or another polymer compatible with component A;
   providing a mixture of the base material and of silane at 0.5 to 10 parts silane per 100 parts by weight graftable base material together with additives needed for grafting, such as a grafting initiator;
   grafting the silane onto those macromolecules of the base material capable of receiving such silane; and
   subsequently forming the material into the desired shape prior to final crosslinking of the graft material in the presence of moisture.

2. Method as in claim 1, wherein component A is polyethylene and component B is a silane-graftable polymer or elastomer.

3. Method as in claim 2, wherein the elastomer is ethylene-propylene rubber.

4. Method as in claim 1, wherein the components of the base material are blended prior to grafting.

5. Method as in claim 1, wherein component A is mixed first with said silane and said additives, and said silane is grafted prior to mixing the silane-grafted component A with the ungrafted component B.

6. Method as in claim 2, wherein each said components A and B is separately mixed with a silane or a silane compound and additives and is separately grafted; the grafted components A and B are subsequently blended.

7. Method as in claim 1, wherein component A is pure polyethylene and component B is an elastomer.

8. Method as in claim 7, wherein the weight ratio of component A to component B is about 70% to 90% component A and 30% to 10% component B.

9. Method as in claim 7, wherein component B is an ethylene-propylene rubber.

10. Method as in claim 1, wherein component A is a copolymer of ethylene with a small amount of at least one of the following acrylate, butene, hexene, propylene, and vinyl acetate; and component B is a thermoplastic polymer other than said copolymer upon which silane is grafted.

* * * * *